(12) United States Patent
Suzuki et al.

(10) Patent No.: US 7,140,758 B2
(45) Date of Patent: Nov. 28, 2006

(54) MECHANISM FOR DEFLECTING HEADLAMP OPTICAL AXIS WITHOUT SPEED REDUCTION GEARS

(75) Inventors: Yuzuru Suzuki, Shizuoka (JP); Kunitake Matsushita, Shizuoka (JP); Sylvie Belavsky, Baillet en France (FR)

(73) Assignee: Minebea Co., Ltd., Nagano (JP)

( * ) Notice: Subject to any disclaimer, the term of this patent is extended or adjusted under 35 U.S.C. 154(b) by 262 days.

(21) Appl. No.: 10/787,008

(22) Filed: Feb. 24, 2004

(65) Prior Publication Data
US 2004/0165395 A1 Aug. 26, 2004

(30) Foreign Application Priority Data
Feb. 26, 2003 (JP) ............................ 2003-050096

(51) Int. Cl.
*F21V 19/02* (2006.01)
(52) U.S. Cl. ...................... 362/523; 362/285; 362/531
(58) Field of Classification Search ............... 362/523, 362/524, 465, 466, 467, 525, 529, 530, 531, 362/507, 508, 277, 282–287; 78/828, 829, 78/830, 424.71
See application file for complete search history.

(56) References Cited

U.S. PATENT DOCUMENTS

| | | | | |
|---|---|---|---|---|
| 1,514,869 A | * | 11/1924 | Solosabal et al. | 362/54 |
| 3,913,084 A | | 10/1975 | Bollinger et al. | |
| 4,217,631 A | * | 8/1980 | Bergkvist | 362/348 |
| 4,482,939 A | | 11/1984 | Tishman | |
| 5,111,341 A | | 5/1992 | Keast | |
| 5,664,865 A | * | 9/1997 | Menke | 362/35 |
| 5,957,563 A | * | 9/1999 | Moore | 362/40 |
| 6,157,103 A | | 12/2000 | Ohta et al. | |
| 6,238,071 B1 | * | 5/2001 | Fratty | 362/514 |
| 6,478,457 B1 | | 12/2002 | Manley | |
| 6,799,876 B1 | * | 10/2004 | Ravier | 362/524 |
| 2002/0097585 A1 | | 7/2002 | Mochizki et al. | |

FOREIGN PATENT DOCUMENTS

| | | |
|---|---|---|
| EP | 1270323 A1 | 1/2003 |
| JP | 08-308205 | 11/1996 |
| JP | 2001-277938 | 10/2001 |
| JP | 2002-234382 | 8/2002 |
| JP | 2002-326536 | 11/2002 |

* cited by examiner

*Primary Examiner*—Renee Luebke
*Assistant Examiner*—Gunyoung T. Lee
(74) *Attorney, Agent, or Firm*—Townsend and Townsend and Crew LLP

(57) ABSTRACT

A mechanism for deflecting a headlamp optical axis comprises a connecting lever, a bracket, a stepping motor, a front end plate, and a traveling block. The bracket is attached to an outside frame constituting an automotive vehicle body, and the stepping motor is attached to the bracket in a horizontally movable manner. The stepping motor has a rotary shaft which has a screw formed thereon and engaging threadedly with the traveling block. The connecting lever is attached to the outside frame in a horizontally movable manner. In the mechanism structured above, when the rotary shaft rotates, the traveling block is caused to travel along the rotary shaft thereby causing the both ends of the connecting lever to move in respective arc paths, whereby an optical axis of a headlamp attached to one of the both ends of the connecting lever is deflected.

5 Claims, 5 Drawing Sheets

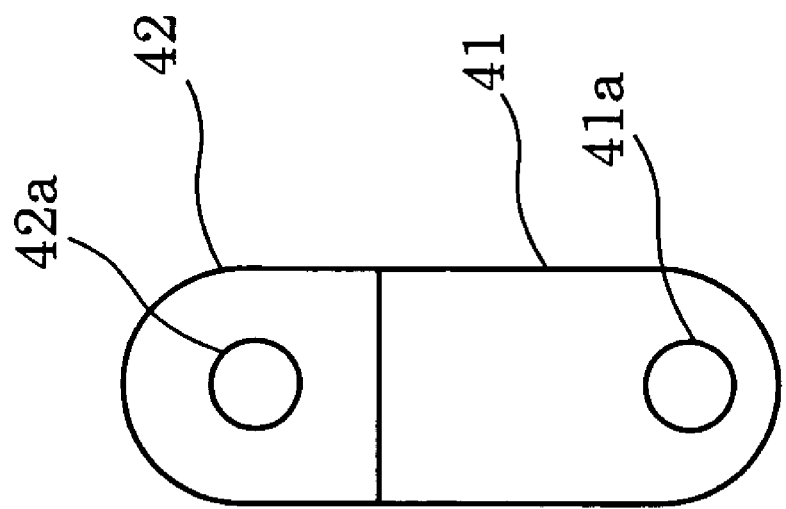
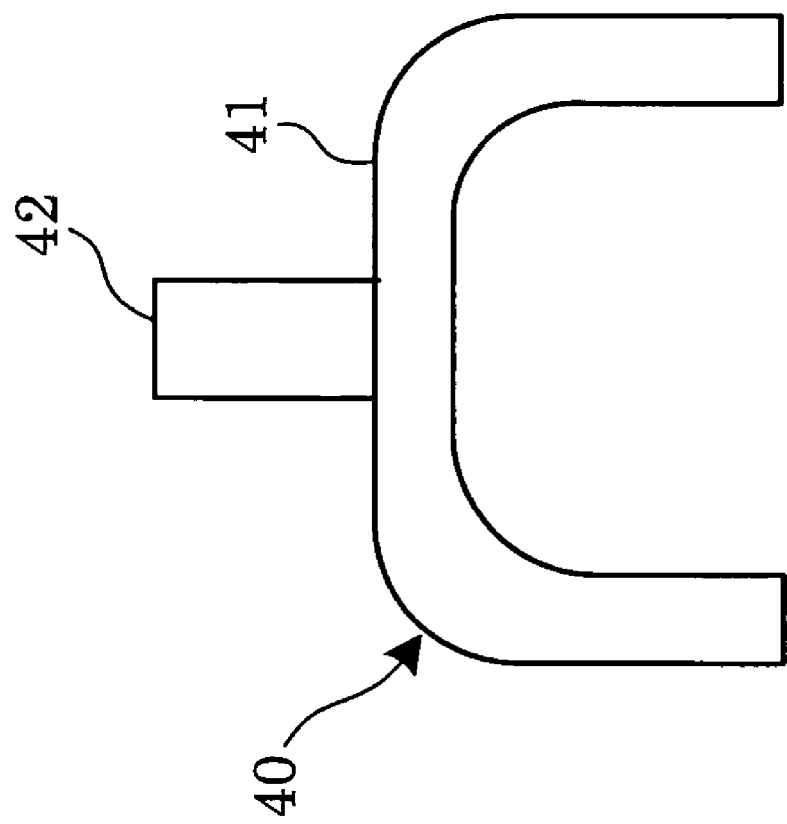
FIG. 4A
FIG. 4B

MECHANISM FOR DEFLECTING HEADLAMP OPTICAL AXIS WITHOUT SPEED REDUCTION GEARS

BACKGROUND OF THE INVENTION

1. Field of the Invention

The present invention relates to a mechanism for deflecting a headlamp optical axis, which does not use speed reduction gears, and further to a mechanism for swinging an object, which does not use speed reduction gears.

2. Description of the Related Art

Some headlamps mounted on the recent automotive vehicles come in an AFS (Adaptive Front-lighting System). The AFS allows light beam direction to be adjusted in response to driving conditions by swinging the entire headlamp assembly. A mechanism for deflecting a headlamp optical axis is disclosed, for example, in Japanese Patent Applications KOKAI Publications Nos. 2001-277938 (Paragraphs 0032 to 0034, FIG. 7 therein), 2002-326536 (FIG. 4 therein), and 2002-234382 (Paragraph 0009, FIG. 4 therein), which comes in an AFS, and which deflects a headlamp optical axis horizontally in accordance with degree of steering angle.

In a mechanism to deflect a headlamp optical axis disclosed in the aforementioned Japanese Patent Application KOKAI Publication No. 2001-277938, an actuator is provided under a headlamp assembly including a lamp and a reflector. As described in the aforementioned Japanese Patent Applications KOKAI Publications Nos. 2002-326536 and 2002-234382, each actuator includes a stepping motor and a plurality of gears adapted to reduce rotation speed of the stepping motor at a large ratio.

A conventional mechanism for deflecting a headlamp optical axis incorporated in an AFS employs a plurality of speed reduction gears as well as a stepping motor, thus requiring management of the gears, and hindering cost reduction. Also, increase in the number of gears employed involves a risk of increasing deflection error. The same problems are seen in a mechanism for swinging an object, which employs a plurality of speed reduction gears in addition to a motor.

SUMMARY OF THE INVENTION

The present invention has been made in light of the above problems, and it is an object of the present invention to provide a mechanism for deflecting a headlamp optical axis, and further to a mechanism to swing an object, which do not use speed reduction gears.

In order to achieve the object of the present invention, according to a first aspect of the present invention, a mechanism for deflecting a headlamp optical axis comprises a connecting lever, a bracket, a motor, a motor attaching member, and a traveling block. The connecting lever defines a first end and a second end, and has the first end fixed to a headlamp assembly which emits light and which is mounted on an automotive vehicle, and a prescribed portion between the first and second ends of the connecting lever is attached in a horizontally movable manner to one predetermined portion of an outside frame which either encloses the headlamp assembly or constitutes a body of the automotive vehicle. The bracket has its first end fixedly attached to another predetermined portion of the outside frame. The motor includes a motor body which includes a rotating mechanism, and a rotary shaft which has its rearward portion inserted through the motor body, has its frontward portion sticking out from the motor body, and which has a spiral screw formed on the frontward portion thereof. The motor attaching member is for attaching the motor to a second end of the bracket such that the motor can move horizontally. And, the traveling block is shaped substantially hollow-cylindrical, has a screw formed on its inner circumference so as to threadedly engage with the spiral screw formed on the rotary shaft, has its outer circumference attached to the second end of the connecting lever in a horizontally movable manner, and is caused to travel along the rotary shaft when the rotary shaft rotates with respect to the motor body. Thus, since no gears are employed to reduce the rotation supped of the rotary shaft, it is not required to manage those gears with respect to procurement, quality, assembly, cost, and the like, and deterioration in accuracy resulting from the employment of the speed reduction gears can be eliminated.

In the first aspect of the present invention, the headlamp assembly may emit light from its front surface and may have its rear portion fixed to the connecting lever. Since the motor, the traveling block, and the connecting lever are adapted to move horizontally while the connecting lever is attached to the rear end portion of the headlamp assembly, the entire height of the headlamp assembly and the mechanism can be reduced compared with a conventional mechanism in which an actuator is disposed under a headlamp assembly. This increases the degree of design freedom for an automotive vehicle.

In the first aspect of the present invention, the connecting lever, the bracket, the motor, the motor attaching member, and the traveling block may be housed in one chassis. Consequently, a satisfactory dust-proof construction can be achieved.

In the first aspect of the present invention, the motor may be a stepping motor. Since the stepping motor can provide a precise rotation angle control, the deflection of a headlamp optical axis can be precisely controlled.

In the first aspect of the present invention, the motor attaching member may be constituted by a front end plate which has a center hole formed at its main section and allowing the rotary shaft to go therethrough, includes arm sections formed at rim portions of the main section and bent toward the rear end of the motor body, and which has the main section attached to a portion of the motor body having the rotary shaft sticking out, and the motor may be attached such that the arm sections of the front end plate are movably jointed to the second end of the bracket. With the front end plate structured as above, motors originally intended for other applications can be flexibly attached to the mechanism. This results in volume efficiency thus reducing the production cost.

According to a second aspect of the present invention, a mechanism to swing an object comprises: a motor, a traveling block, a bracket, and a connecting lever. The motor includes a motor body which includes a rotating mechanism, and a rotary shaft which has a rearward portion thereof inserted through the motor body, has a frontward portion thereof sticking out from the motor body, and which has a spiral screw formed on the frontward portion. The traveling block is shaped substantially hollow-cylindrical, has a screw formed on its inner circumference so as to threadedly engage with the spiral screw formed on the rotary shaft, and is caused to travel along the rotary shaft when the rotary shaft rotates with respect to the motor body. The bracket includes a leg section to be fixed to one predetermined portion of an outside support body, and a motor holding section to hold the motor such that the motor can move in a plane. And, the connecting lever has a first end thereof fixed to an object to be swung, and has a second end thereof freely attached to an outer circumference of the traveling block such that the traveling block can travel along the rotary shaft in a plane parallel to the plane in which the motor moves, and a prescribed portion between the first and second ends of the connecting lever is attached to another predetermined portion of the outside support body such that the first and second ends of the connecting lever can move in a plane parallel to the plane in which the motor moves. The mechanism thus structured has the above-described effects and advantages achieved by the first aspect of the present invention.

BRIEF DESCRIPTION OF THE DRAWINGS

The above object and other advantages of the present invention will become more apparent by describing in detail the preferred embodiment of the present invention with reference to the attached drawings in which:

FIGS. 4A and 4B show a bracket in FIG. 1, respectively representing its front and side views.

DETAILED DESCRIPTION OF THE PREFERRED EMBODIMENT

A mechanism for deflecting a headlamp optical axis according to an embodiment of the present invention will hereinafter be described with reference to FIGS. 1 to 4A and 4B.

Figure 1:
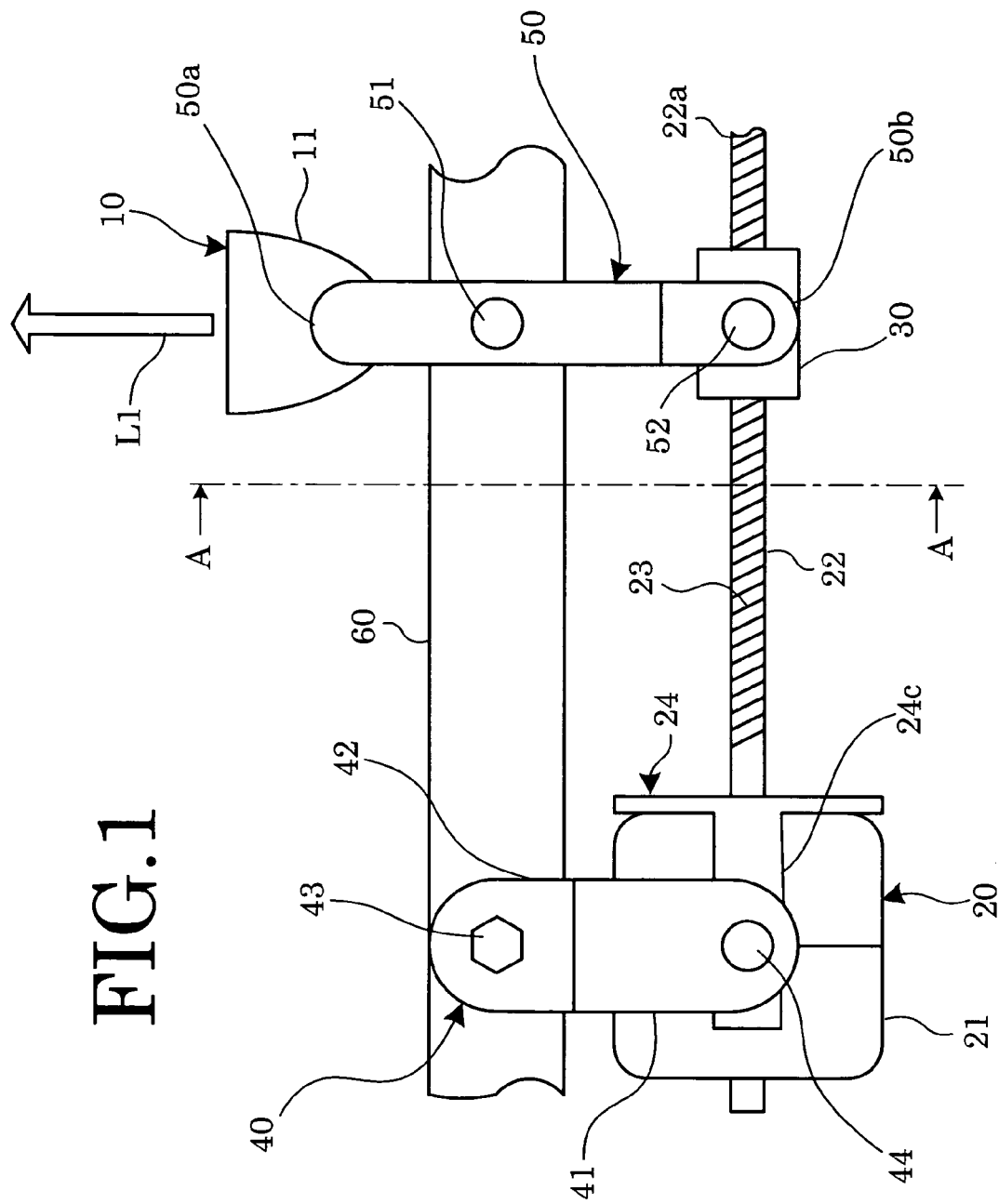
FIG. 1 is a plan view of a mechanism for deflecting a headlamp optical axis according to an embodiment of the present invention.

A mechanism for deflecting a headlamp optical axis shown in FIG. 1 is mounted on an automotive vehicle, and adapted to swing a headlamp assembly 10 in the horizontal direction. The mechanism comprises a stepping motor 20, a traveling block 30, a bracket 40, and a connecting lever 50. The headlamp assembly 10, the stepping motor 20, the traveling block 30, the bracket 40, and the connecting lever 50 are housed in a chassis (not shown).

Figure 2:
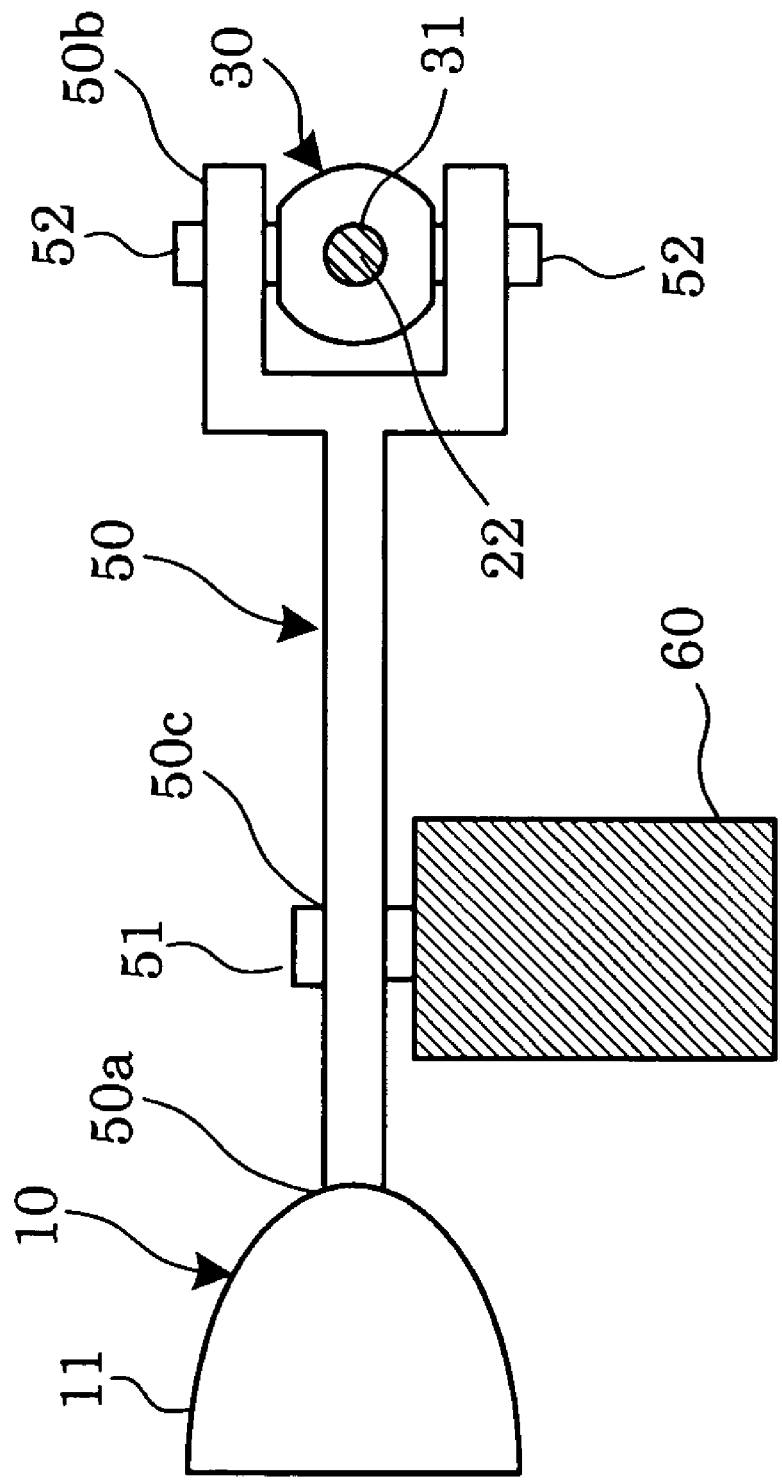
FIG. 2 is a cross sectional view of the mechanism for deflecting a headlamp optical axis of FIG. 1 taken along a line A—A.

The headlamp assembly 10 includes a lamp (not shown), and a reflector 11 to enclose the lamp from behind and to reflect light emitted from the lamp frontward. As shown in FIG. 2, the connecting lever 50 has a first end 50a thereof attached by, for example, welding to a rear portion of the headlamp assembly 10, specifically to a rear portion of the reflector 11.

The stepping motor 20 includes a motor body 21 and a rotary shaft 22. The motor body 21 includes a mechanism to rotate the rotary shaft 22. The rotary shaft 22 has its frontward portion (toward a front end 22a) sticking out from the motor body 21, and has its rearward portion inserted through the motor body 21. A spiral screw 23 is formed at the frontward portion of the rotary shaft 22, which sticks out from the motor body 21 toward the front end 22a. The motor body 21 further includes terminals (not shown) disposed at its circumference, to which a signal is inputted.

Figure 3B:
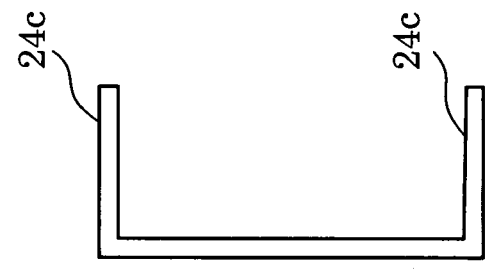
FIGS. 3A, 3B and 3C show a front end plate in FIG. 1, respectively representing its front, side and plan views.
Figure 3C:
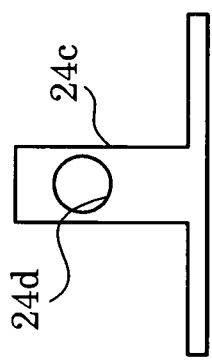
Figure 3A:
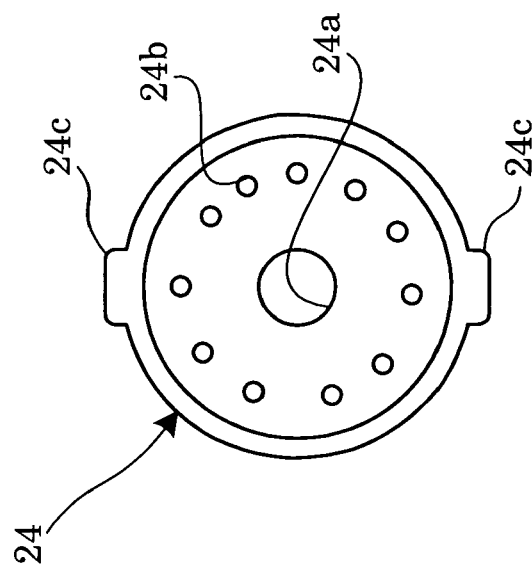

A front end plate 24 as motor attaching member is attached to a front end face of the motor body 21 facing toward the front end 22a of the rotary shaft 22. Referring to FIGS. 3A to 3C, the front end plate 24 is formed of a plate, and has a center hole 24a formed at the center of its round main section, through which the rotary shaft 22 is inserted. The front end plate 24 has, on its main section, also a plurality (eleven in the embodiment) of positioning holes 24b arranged in a circle around the center hole 24a. A boss member (not shown) formed at the front end face of the motor body 21 fits into one positioning hole 24b selected out of the eleven thereby selectively determining an optimum position or orientation of the terminals (not shown). The front end plate 24 further includes two arm sections 24c formed respectively at two straightly opposing rim portions of the main section and bent at a right angle toward the rear end of the motor body 21. Each of the arm sections 24c has a hole 24d toward its distal portion.

The traveling block 30 is shaped substantially hollow-cylindrical, and has a screw 31 (refer to FIG. 2) formed at its inner circumference and engaging threadedly with the spiral screw 23 formed on the rotary shaft 22, whereby the traveling block 30 is caused to travel along the rotary shaft 22 when the rotary shaft 22 rotates.

Referring to FIG. 4A, the bracket 40 is shaped like a broadened tuning fork in its front view, and comprises a motor holding section 41, and a leg section 42. The motor holding section 41 is shaped like a U-letter, and the leg section 42 is formed at the bottom bar of the U-letter and extends outwardly. Referring to FIG. 4B, the leg section 42 has a hole 42a, and the bracket 40 is fixedly attached to a outside frame 60 (refer to FIG. 1) by means of a bolt 43 (refer to FIG. 1) going through the hole 42a and driven into the outside frame 60. The motor holding section 41 has two holes 41a formed respectively toward its both end portions, and as shown in FIG. 1 two pins 44 (only one is shown in the figure) are put through respective holes 41a and respective holes 24d of the arm sections 24c of the front end plate 24 attached to the motor body 21 so as to movably hold the stepping motor 20.

Referring now to FIG. 2, a second end 50b of the connecting lever 50 is structured into a squared U-shape, and is adapted to sandwich and hold movably the traveling block 30 by means of two pins 52. The connecting lever 50 is movably attached to the outside frame 60 by means of a pin 51 which goes through a hole 50c formed at a prescribed portion of the connecting lever 50 positioned between the first end 50a and the second end 50b, and which is driven into the outside frame 60. Accordingly, the first and second ends 50a and 50b can move horizontally in respective arc paths about the pin 51.

Figure 5:
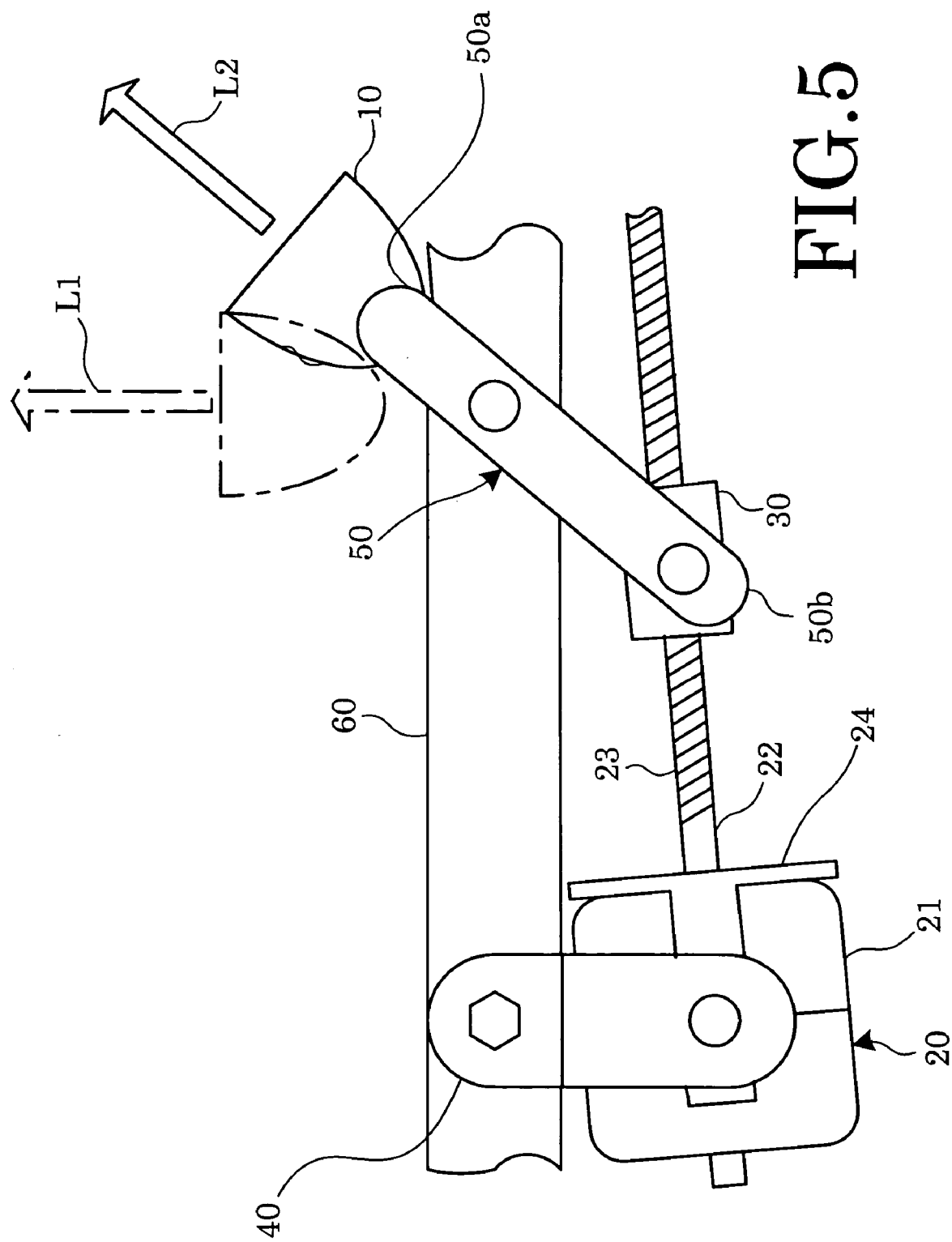
FIG. 5 is an explanatory view of actuation of the mechanism for deflecting a headlamp optical of FIG. 1.

Discussion will be made on the actuation of the mechanism for deflecting a headlamp optical axis of FIG. 1 with reference to FIG. 5. A pulse signal is inputted to the terminals (not shown) of the stepping motor 20 thereby exciting the rotating mechanism of the stepping motor 20 so as to cause the rotary shaft 22 to rotate. When the rotary shaft 22 rotates, the traveling block 30, which has its built-in inner circumferential screw 31 engaging threadedly with the spiral screw 23 of the rotary shaft 22, travels along the rotary shaft 22, for example, toward the motor body 21.

When the traveling block 30 travels as described above, the second end 50b of the connecting lever 50 travels together with the traveling block 30 horizontally in an arc path thereby causing the first end 50a to move horizontally in an arc path. The headlamp assembly 10 attached to the first end 50a of the connecting lever 50 moves horizontally in an arc path together with the first end 50a, thus the headlamp assembly 10 has its original optical axis L1 (refer to FIG. 1) deflected to an optical axis L2. In this connection, when the rotary shaft 22 reverses its rotational direction, the headlamp assembly 10 moves in a reversed direction following its arc path backward.

The present invention is not limited to the embodiment described above, and many modifications and variations are possible in light of the above teaching. For example: the stepping motor may alternatively be a different type motor such as a DC motor; the connecting lever and the bracket may be shaped differently from what are shown in the drawings; and other objects than the headlamp assembly may be attached to the connecting lever wherein the moving actuation is not limited to the horizontal direction. The scope of the invention is, therefore, indicated by the appended claims rather than by the foregoing description.

This application is based on Japanese Patent Application No. 2003-50096 filed on Feb. 26, 2003 and including specification, claims, drawings and summary. The disclosure of above Japanese Patent Application is incorporated herein by reference in its entirety.

What is claimed is:

1. A mechanism for deflecting a headlamp optical axis, the mechanism comprising:
    a connecting lever defining a first end and a second end, having the first end fixed to a headlamp assembly which emits light and which is mounted on an automotive vehicle, a prescribed portion between the first and second ends of the connecting lever being attached in a horizontally movable manner to one predetermined portion of an outside frame which either encloses the headlamp assembly or constitutes a body of the automotive vehicle;
    a bracket having a first end thereof attached to another predetermined portion of the outside frame;
    a motor including a motor body which includes a rotating mechanism, and a rotary shaft which has a rearward portion thereof inserted through the motor body, has a frontward portion thereof sticking out from the motor body, and which has a spiral screw formed on the frontward portion thereof;
    a motor attaching member for attaching the motor to a second end of the bracket in a horizontally moveable manner; and
    a traveling block shaped substantially hollow-cylindrical, having a screw formed on an inner circumference so as to threadedly engage with the spiral screw formed on the rotary shaft, and having an outer circumference attached to the second end of the connecting lever in a horizontally movable manner, the traveling block being caused to travel along the rotary shaft when the rotary shaft rotates with respect to the motor body;
    wherein the motor attaching member is constituted by a front end plate which has a center hole formed at its main section and allowing the rotary shaft to go therethrough, includes arm sections Conned at rim portions of the main section and bent toward a rear end of the motor body, and which has the main section attached to a portion of the motor body having the rotary shaft sticking out, and wherein the motor is attached such that the arm sections of the front end plate are movably jointed to the second end of the bracket.

2. A mechanism according to claim 1, wherein the headlamp assembly emits light from a front surface and has a rear portion fixed to the connecting lever.

3. A mechanism according to claim 1, wherein the connecting lever, the bracket, the motor, the motor attaching member, and the traveling block are housed in a chassis.

4. A mechanism according to claim 1, wherein the motor is a stepping motor.

5. A mechanism for swinging an object, the mechanism comprising:
    a motor including a motor body which includes a rotating mechanism, and a rotary shaft which has a rearward portion thereof inserted through the motor body, has a frontward portion thereof sticking out from the motor body, an which has a spiral screw formed on the frontward portion thereof;
    a traveling block shaped substantially hollow-cylindrical, and having a screw formed on an inner circumference so as to threadedly engage with the spiral screw formed on the rotary shaft, the traveling block being caused to travel along the rotary shaft when the rotary shaft rotates with respect to the motor body;
    a bracket including a first end as a leg section to be fixed to one predetermined portion of an outside support body, and a second end as a motor holding section to hold the motor such that the motor moves in a plane;
    a connecting lever having a first end thereof fixed to an object to be swung, and having a second end thereof freely attached to an outer circumference of the traveling block such that the traveling block travels along the rotary shall in a plane parallel to the plane in which the motor moves, a prescribed portion between the first and second ends of the connecting lever being attached to another predetermined portion of the outside support body such that the first and second ends of the connecting lever can move in a plane parallel to the plane in which the motor moves; and
    a motor attaching member for attaching the motor to the motor holding section of the bracket,
    wherein the motor attaching member is constituted by a front end plate which has a center hole formed at a main section and allowing the rotary shaft to go therethrough, includes arm sections formed at rim portions of the main section and bent toward a rear end of the motor body, and which has the main section attached to a portion of the motor body having the rotary shaft sticking out and wherein the motor is attached such that the arm sections of the front end plate are movably jointed to the motor holding section of the bracket.

* * * * *